US009719539B2

(12) United States Patent
Tachibana

(10) Patent No.: US 9,719,539 B2
(45) Date of Patent: Aug. 1, 2017

(54) FASTENER

(71) Applicant: NIFCO INC., Yokosuka-shi Kanagawa (JP)

(72) Inventor: Norihide Tachibana, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 282 days.

(21) Appl. No.: 14/419,150

(22) PCT Filed: Aug. 7, 2013

(86) PCT No.: PCT/JP2013/004773
§ 371 (c)(1),
(2) Date: Feb. 2, 2015

(87) PCT Pub. No.: WO2014/024488
PCT Pub. Date: Feb. 13, 2014

(65) Prior Publication Data
US 2015/0204363 A1 Jul. 23, 2015

(30) Foreign Application Priority Data
Aug. 7, 2012 (JP) ................. 2012-175004

(51) Int. Cl.
B25G 3/18 (2006.01)
F16B 21/00 (2006.01)
(Continued)

(52) U.S. Cl.
CPC .......... F16B 5/0635 (2013.01); F16B 5/0642 (2013.01); F16B 2/22 (2013.01); Y10T 24/309 (2015.01); Y10T 403/608 (2015.01)

(58) Field of Classification Search
CPC ........ F16B 5/0635; F16B 5/0642; F16B 2/22; Y10T 403/608; Y10T 24/309
(Continued)

(56) References Cited

U.S. PATENT DOCUMENTS 4,408,939 A * 10/1983 Graff ............... F16B 37/041
411/112
5,517,731 A   5/1996 Spykerman
(Continued)

FOREIGN PATENT DOCUMENTS

CN   101193569 A   6/2008
CN   101205943 A   6/2008
(Continued)

Primary Examiner — Gregory Binda
Assistant Examiner — Nahid Amiri
(74) Attorney, Agent, or Firm — Manabu Kanesaka

(57) ABSTRACT

A fastener for superimposing and fastening two sheets of plate-like members, wherein at least one of the plate-like members has a hole formed therein, includes a pair of U-shaped accommodating portions adapted to be inserted with end portions of the two sheets of plate-like members; a pair of connection portions respectively connecting the pair of accommodating portions; a pair of engagement pieces extending from the pair of connection portions in an insertion direction of the plate-like members; an engagement portion formed in each of the pair of engagement pieces, adapted to engage with the hole; and a wobbling suppressing mechanism disposed adjacent to the pair of engagement pieces, and extending from each of the pair of connection portions in the insertion direction of the plate-like members for engaging with the hole.

8 Claims, 5 Drawing Sheets

(51) Int. Cl.
  *F16D 1/00* (2006.01)
  *B25G 3/00* (2006.01)
  *F16B 5/06* (2006.01)
  *F16B 2/22* (2006.01)

(58) Field of Classification Search
  USPC .................................................. 403/329, 330
  See application file for complete search history.

(56) References Cited

U.S. PATENT DOCUMENTS

| | | | | |
|---|---|---|---|---|
| 5,740,640 | A * | 4/1998 | Yasuda | B60J 10/265 296/146.16 |
| 6,327,758 | B1 * | 12/2001 | Petrakis | E04B 9/006 24/293 |
| 6,691,374 | B2 * | 2/2004 | Coyne | A45F 5/02 24/3.1 |
| 6,796,006 | B2 * | 9/2004 | Hansen | F16B 5/065 24/289 |
| 7,401,994 | B2 * | 7/2008 | Kojima | B62D 25/163 24/289 |
| 7,461,436 | B2 * | 12/2008 | Asano | B60R 13/0206 24/297 |
| 7,536,755 | B2 | 5/2009 | Nakajima et al. | |
| 7,837,405 | B2 * | 11/2010 | Amdahl | B42B 5/08 24/487 |
| 8,056,193 | B2 | 11/2011 | Park | |
| 2004/0228678 | A1 | 11/2004 | Kojima et al. | |
| 2007/0050955 | A1 | 3/2007 | Hansen | |
| 2012/0272487 | A1 * | 11/2012 | Cooley | F16B 5/065 24/289 |

FOREIGN PATENT DOCUMENTS

| | | |
|---|---|---|
| EP | 0006106 B1 | 11/1981 |
| GB | 838054 A | 6/1960 |
| JP | S48-22286 U | 6/1973 |
| JP | H03-72054 U | 7/1991 |
| JP | 2000-249118 A | 9/2000 |
| JP | 2001-260581 A | 9/2001 |
| JP | 2003-065307 A | 3/2003 |
| JP | 2004-142535 A | 5/2004 |
| SE | 524481 C2 | 8/2004 |

* cited by examiner

FASTENER

RELATED APPLICATIONS

The present application is National Phase of International Application No. PCT/JP2013/004773 filed Aug. 7, 2013, and claims priority from Japanese Application No. 2012-175004 filed Aug. 7, 2012, the disclosure of which is incorporated herein.

FIELD OF TECHNOLOGY

The present invention relates to a fastener used for reliably fixing two sheets of plate-like members, and especially the fastener for fixing a cowl top cover and a cowl top in an engine compartment of an automobile and the like.

BACKGROUND ART

Generally, as for a fastener for fixing an end portion of a plate-like member, as shown in FIGS. 7 to 9, there is integrally formed a pair of accommodating portions 1 having a U-shaped cross-sectional face by connection pieces 2, and there are formed engagement pieces 3 and 3 facing between the pair of accommodating portions 1. Also, the engagement pieces 3 extend toward an insertion direction of the plate-like member, and inside the engagement pieces 3, there respectively project engagement protrusions 4 alternately. Two sheets of plate-like members are inserted into the U-shaped accommodating portions 1 of the fastener formed in such a manner, and the inserted plate-like members are fixed by being sandwiched by the engagement pieces 3 and 3. Also, as for a fastener for binding a plurality of sheets of papers such as copier papers and the like, there is disclosed a paper clip forming upper and lower elastic urging portions extending corresponding to a hypotenuse of a triangle by folding a plate-like member having an elasticity into an isosceles triangle shape, and one portion in a width direction of the upper and lower elastic urging portions is respectively cut off so as to become a shape in which the upper and lower elastic urging portions are not overlapped with each other (Patent Document 1).

PRIOR ART DOCUMENT

Patent Document

Patent Document 1: Japanese Patent Application No. 2001-260581

SUMMARY OF THE INVENTION

Problems to be Solved by the Invention

In the fastener having a conventional structure, however, a force holding the plate-like member is weak, and especially in a case of holding two sheets of plate-like members, there is a case that wobbling occurs between the plate-like members, and that a noise is generated. Also, the paper clip disclosed in the Patent Document 1 is not suitable for fixing plate-like members made of metal or synthetic resin such as automobile parts and the like even if the paper clip can be used for fixing lightweight plate-like members such as the copier papers and the like.

The present invention is made in order to solve the aforementioned inconveniences, and an object of the present invention is to provide a fastener in which two sheets of plate-like members are locked by a pair of engagement pieces, and are pressed by a wobbling suppressing mechanism (elastic pieces) so as to be reliably engaged to suppress the wobbling and prevent the generation of a noise.

Means for Solving the Problems

The present invention has the following contents.

(1) In order to obtain the aforementioned object, the present invention is a fastener for superimposing and fastening two sheets of plate-like members, wherein at least one of the plate-like members has a hole formed therein, including a pair of U-shaped accommodating portions adapted to be inserted with end portions of the two sheets of plate-like members; a pair of connection portions respectively connecting the pair of U-shaped accommodating portions; a pair of engagement pieces extending from the pair of connection portions in an insertion direction of the plate-like members; and an engagement portion formed in each of the pair of engagement pieces, adapted to engage with the aforementioned hole. Also, the fastener includes a wobbling suppressing mechanism each being disposed adjacent to the pair of engagement pieces, and extending from each of the pair of connection portions in the insertion direction of the plate-like members for engaging with the aforementioned hole.

(2) Also, the wobbling suppressing mechanism is provided on each of two sides of the pair of engagement pieces in such a way as to sandwich the corresponding engagement piece.

(3) The wobbling suppressing mechanism includes elastic pieces each extending from each of the pair of connection portions in the insertion direction of the plate-like members; and pressing protrusions provided on inner sides of tips of the pair of elastic pieces respectively, and the pair of pressing protrusions is disposed to face each other at an interval narrower than a plate thickness of the two sheets of plate-like members.

(4) A position of a base end portion of each of the pair of engagement pieces extending from the pair of connection portions is different from a position of a base end portion of the elastic piece extending from the connection portion. Specifically, the positions of the base end portion of the engagement piece extending from the connection portion and the base end portion of the elastic piece extending from the connection portion differ in the insertion direction of the plate-like members.

(5) In the engagement portion formed in the engagement piece, there is formed a notch portion at one portion of a tip.

Effect of the Invention

According to the invention, the fastener superimposes and fastens two sheets of plate-like members, and comprises the pair of U-shaped accommodating portions adapted to be inserted with the end portions of the two sheets of plate-like members; the pair of connection portions respectively connecting the pair of U-shaped accommodating portions; the pair of engagement pieces extending from the pair of connection portions in the insertion direction of the plate-like members; and the engagement portion formed in each of the pair of engagement pieces, adapted to engage with the hole formed in at least one of the plate-like members. Also, the fastener comprises the wobbling suppressing mechanism each being disposed adjacent to the pair of engagement pieces, and extending from each of the pair of connection portions in the insertion direction of the plate-like members so as to prevent two sheets of plate-like members from wobbling. Also, the wobbling suppressing mechanism can prevent the generation of a noise. Also, the wobbling suppressing mechanism is provided on each of two sides of the engagement piece in such a way as to sandwich the engagement piece so as to prevent the plate-like members from wobbling. Also, the wobbling suppressing mechanism includes the elastic pieces respectively extending from each of the pair of connection portions in the insertion direction of the plate-like members, and on the inner sides of the tips of the pair of elastic pieces, a pair of pressing protrusions is disposed to face each other at the interval narrower than the thickness of the two sheets of plate-like members so as to press and fix the plate-like members by the elastic pieces to prevent an occurrence of wobbling. Also, the positions of the base end portion of the engagement piece extending from the connection portion and the base end portion of the elastic piece extending from the connection portion differ, so that elastic coefficients of the engagement piece and the elastic piece, which hold the plate-like member, become different. Therefore, an elasticity of the engagement piece weakens so as to allow the plate-like member to be easily inserted, and an elasticity of the elastic piece strengthens so as to increase a pressing force of the plate-like member to suppress the wobbling. Also, in the engagement portion formed in each of the pair of engagement pieces, there is formed the notch portion at one portion of the tip so as to reduce an insertion force of the plate-like member.

BEST MODES OF CARRYING OUT THE INVENTION

A fastener of the present invention comprises a pair of U-shaped accommodating portions adapted to be inserted into an end portion of a plate-like member; a pair of connection portions respectively connecting the pair of U-shaped accommodating portions; a pair of engagement pieces extending from the pair of connection portions in an insertion direction of the plate-like member; an engagement portion formed in each of the pair of engagement pieces, adapted to engage with a hole formed in at least one of the plate-like members; and an wobbling suppressing mechanism disposed adjacent to the pair of engagement pieces, and extending from each of the connection portions in the insertion direction of the plate-like member so as to suppress wobbling of the plate-like member and prevent the generation of a noise.

FIRST EXAMPLE

Figure 1:
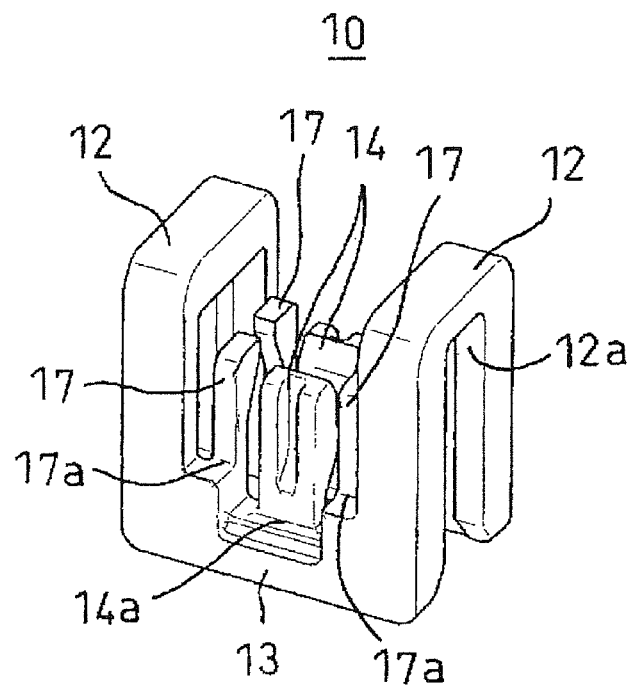
FIG. 1 is a perspective view of a fastener showing one embodiment of the present invention.
Figure 2:
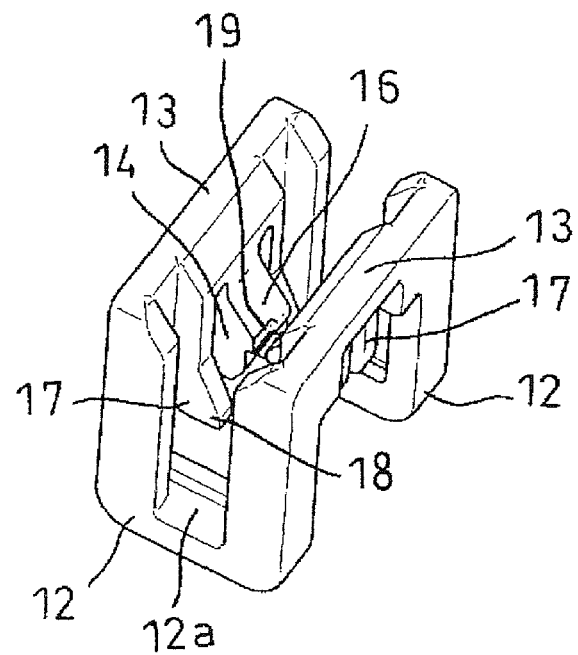
FIG. 2 is a perspective view seen from another direction of the same fastener.
Figure 3:
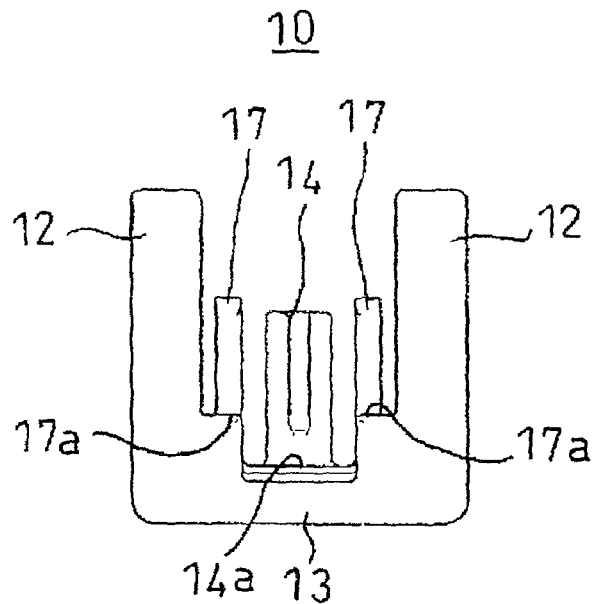
FIG. 3 is a front view of the same fastener.
Figure 4:
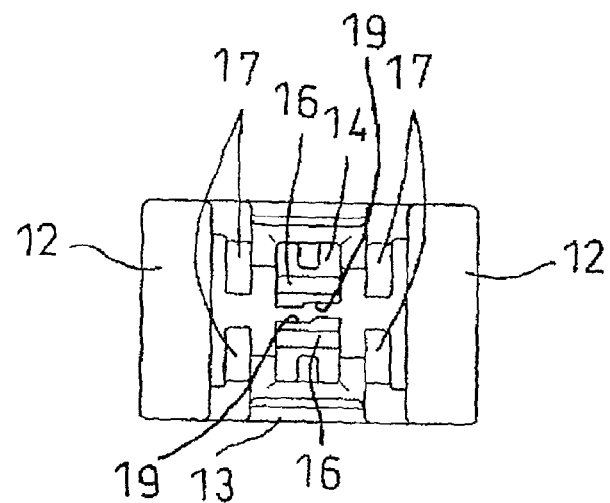
FIG. 4 is a plan view of the same fastener.
Figure 5:
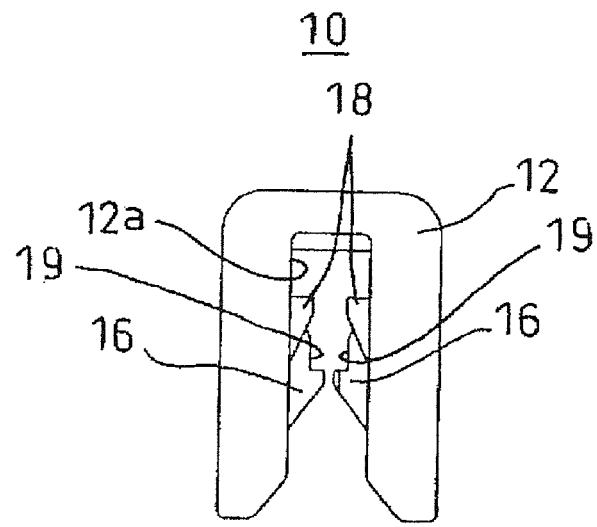
FIG. 5 is a side view of the same fastener.

Hereinafter, the present invention will be explained in detail based on the drawings showing one embodiment. FIG. 1 is a perspective view of the fastener showing one embodiment of the present invention; FIG. 2 is a perspective view seen from another direction of the fastener of the present invention; FIG. 3 is a front view thereof; FIG. 4 is a plan view thereof; and FIG. 5 is a side view thereof. Here, a fastener 10 superimposes and fastens two sheets of plate-like members 11a and 11b, and comprises a pair of accommodating portions having a U shape (U-shaped accommodating portions) 12 inserted into end portions of two sheets of plate-like members; a pair of connection portions 13 respectively connecting the U-shaped accommodating portions 12; a pair of engagement pieces 14 extending from the connection portions 13 in an insertion direction of two sheets of plate-like members 11a and 11b; and an engagement portion 16 formed in the pair of engagement pieces 14, and engaging with a hole 15 formed in at least one of the plate-like members of the two sheets of plate-like members. Also, the fastener 10 comprises elastic pieces 17, which are the wobbling suppressing mechanism, adjacent to the engagement pieces 14 and extending from the connection portions 13 in the insertion direction of the two sheets of plate-like members 11a and 11b.

The U-shaped accommodating portion 12 is formed by elastically deformable synthetic resin and the like, and includes a concave portion 12a having an approximately rectangular shape into which the plate-like member is inserted. A shape of the accommodating portion 12 is not limited to the U shape provided that it forms the concave portion 12a into which the plate-like member can be inserted. The accommodating portion 12 may be formed in, for example, a U shape with rounded corners in place of the U shape. A shape of the concave portion 12a is not limited to the approximately rectangular shape, and may be a trapezoid shape and the like formed such that a width of an opening end side is narrow (or wide) compared to a back side. Also, the pair of connection portions 13 integrally connects the right-and-left U-shaped accommodating portions 12. In the present embodiment, each connection portion 13 respectively connects each accommodating portion 12 at a base end side (a bottom side of the concave portion 12a) opposing the opening end side of the accommodating portion 12.

The engagement piece 14 is formed by elastically deformable synthetic resin and the like, is positioned between the right-and-left U-shaped accommodating portions 12, and extends from the connection portion 13 in a direction where a plate-like member 11 is inserted (the top in FIG. 1). Also, the engagement piece 14 includes the engagement portion 16 engaging with the hole 15 formed in the plate-like member 11 and formed to project by facing inward. Moreover, in the engagement portion 16 formed in the engagement piece 14, there is formed a notch portion 19 at one portion of a tip. Specifically, one portion in a projection direction of the engagement portion 16 formed in the engagement piece 14 is notched so as to decrease a projection quantity. Thereby, an insertion force when the plate-like member 11 is inserted can be reduced.

The elastic piece 17 is formed by elastically deformable synthetic resin and the like, is positioned on the right and left of the engagement piece 14 and between the U-shaped accommodating portions 12, and extends from the connection portion 13 in the direction where the plate-like member 11 is inserted (the top in FIG. 1). Also, on an inner side of a tip of the elastic piece 17, there is disposed a pair of pressing protrusions 18 protruding to face each other at an interval narrower than a plate thickness of the two sheets of plate-like members 11a and 11b. Therefore, as shown in FIG. 5, in the concave portion 12a having the approximately rectangular shape of the U-shaped accommodating portion 12, the engagement portion 16 and the pressing protrusion 18 respectively project. Moreover, positions of a base end portion 14a of the engagement piece 14 extending from the connection portion 13 and a base end portion 17a of the elastic piece 17 extending from the connection portion 13 differ. Namely, the positions of the base end portion 14a of the engagement piece 14 extending from the connection portion 13 and the base end portion 17a of the elastic piece 17 extending from the connection portion 13 differ in the insertion direction of the plate-like member 11. Basically, a length of an arm of the engagement piece 14 and a length of an arm of the elastic piece 17 differ, and the engagement piece 14 and the elastic piece 17 have different rigidities. Specifically, the rigidity of the engagement piece is formed to be weaker than the rigidity of the elastic piece 17 so as to allow the plate-like member 11 to be easily inserted and to prevent the plate-like member 11 from wobbling by the elastic piece 17 having the rigidity.

Figure 6:
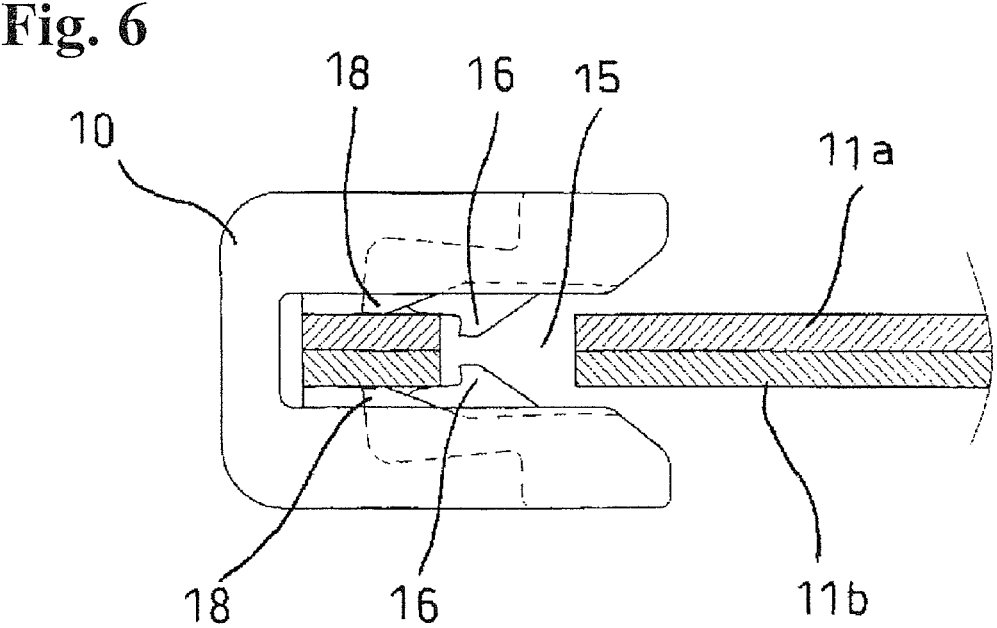
FIG. 6 is a cross-sectional view showing a state wherein a cowl top is engaged with the same fastener.
Figure 7:
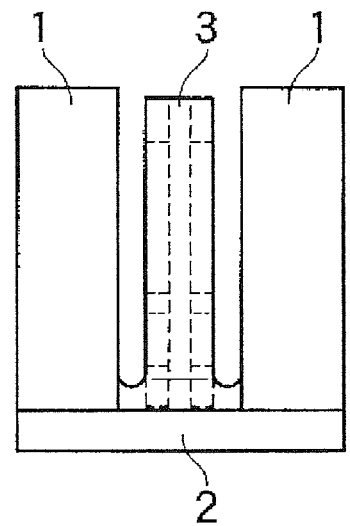
FIG. 7 is a front view showing one example of a conventional fastener.
Figure 8:
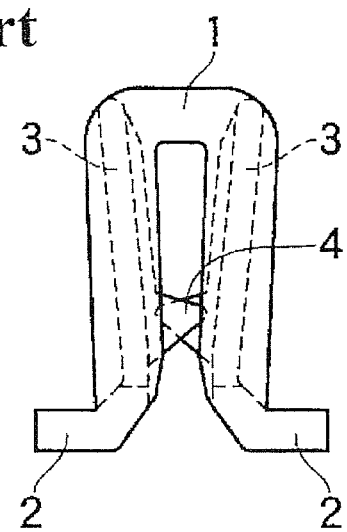
FIG. 8 is a side view of the same fastener.
Figure 9:
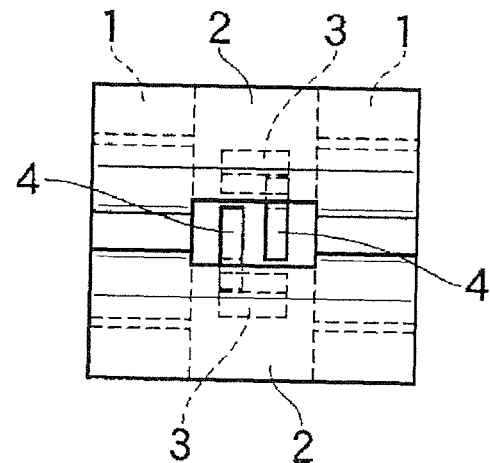
FIG. 9 is a plan view of the same fastener.
Figure 10:
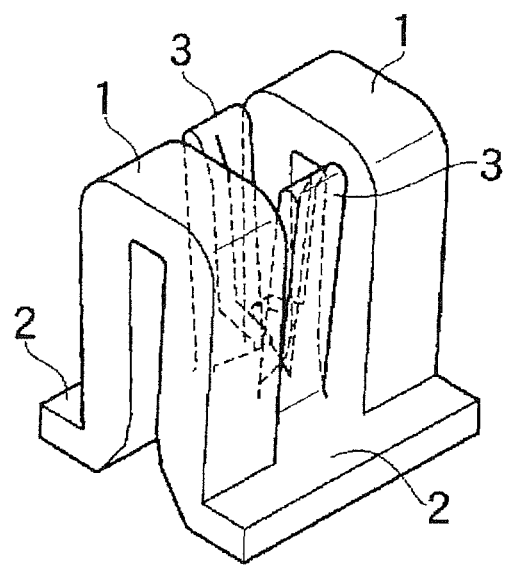
FIG. 10 is a perspective view of the same fastener.

As shown in FIG. 6, the two sheets of plate-like members 11a and 11b, for example, a cowl top and a cowl top cover are superimposed to be mounted onto the concave portion 12a of the U-shaped accommodating portion 12 of the fastener 10 formed in the aforementioned manner. When the plate-like member 11 is mounted, the hole 15 formed at an end portion is engaged with the engagement portion 16 of the engagement piece 14, and the end portion of the plate-like member 11 is pressed and fixed from both sides by the pressing protrusions 18 formed in the elastic pieces 17. Namely, the two sheets of plate-like members 11a and 11b mounted onto the concave portion 12a of the U-shaped accommodating portion 12 are pressed by the pair of engagement pieces 14 and the pressing protrusions 18 formed in four elastic pieces 17, and the hole 15 formed at the end portion is engaged with the engagement portions 16 of the engagement pieces 14 so as to have no risk of wobbling or generating a noise even if external vibrations are received.

Thus, the fastener 10 of the present invention is pressed and fixed by two engagement pieces 14 and four elastic pieces 17 which are the wobbling suppressing mechanism so as to strongly retain the two sheets of plate-like members 11a and 11b.

The fastener of the present invention can be widely used as a fixation tool of the plate-like member in addition to a fixation of the cowl top cover and the cowl top of an automobile and the like.

EXPLANATION OF SYMBOLS 10 a fastener
11a, 11b plate-like members
12 a U-shaped accommodating portion
12a a concave portion
13 a connection portion
14 an engagement piece
14a a base end portion
15 a hole
16 an engagement portion
17 an elastic piece
18 a pressing protrusion
19 a notch portion

What is claimed is:

1. A fastener for superimposing and fastening two sheets of plate-shaped members, wherein at least one of the plate-shaped members has a hole formed therein, comprising:
   a pair of U-shaped accommodating portions adapted to be inserted with end portions of the two sheets of plate-shaped members;
   a pair of connection portions respectively connecting the pair of accommodating portions;
   a pair of engagement pieces extending from the pair of connection portions in an insertion direction of the plate-shaped members;
   an engagement portion formed in each of the pair of engagement pieces, adapted to engage with the hole; and
   a wobbling suppressing mechanism disposed adjacent to each of the pair of engagement pieces, and extending from each of the pair of connection portions in the insertion direction of the plate-shaped members, the wobbling suppressing mechanism including
      elastic pieces each extending from each of the pair of connection portions along the insertion direction of the plate-shaped members, and
      pressing protrusions each provided on an inner side of a tip of each of the elastic pieces,
   wherein the pressing protrusions are configured to face each other at an interval narrower than a thickness of the two sheets of the plate-shaped members.

2. A fastener according to claim 1, wherein the wobbling suppressing mechanism is provided on each of two sides of the pair of engagement pieces to sandwich the corresponding engagement piece.

3. A fastener according to claim 1, wherein a position of a base end portion of each of the pair of engagement pieces extending from the pair of connection portions is different from a position of a base end portion of each of the elastic pieces extending from the pair of connection portions along the insertion direction of the plate-shaped members.

4. A fastener according to claim 1, wherein the engagement portion formed in each of the pair of engagement pieces is formed with a notch portion.

5. A fastener according to claim 1, wherein the pressing protrusions of the wobbling suppressing mechanism are arranged only at free end portions of the elastic pieces and protrude toward each other, the free end portions being opposite to a base end portion of each of the pair of engagement pieces.

6. A fastener according to claim 5, wherein the elastic pieces of the wobbling suppressing mechanism have a length different from that of the pair of engagement pieces.

7. A fastener according to claim 6, wherein the wobbling suppressing mechanism further includes two other elastic pieces facing each other, each extending from each of the pair of connection portions such that the pair of engagement pieces is respectively located between the elastic pieces and the two other elastic pieces, and
   two other pressing protrusions each provided on an inner side of a tip of each of the two other elastic pieces.

8. A fastener according to claim 7, wherein the pair of U-shaped accommodating portions is disposed parallel to each other in a direction perpendicular to the insertion direction of the plate-shaped members, and
   the pair of connection portions extends between the pair of accommodating portions to respectively connect the pair of accommodating portions.

* * * * *